(12) United States Patent
Kim et al.

(10) Patent No.: US 11,747,851 B2
(45) Date of Patent: Sep. 5, 2023

(54) ORGAN-TYPE ELECTRONIC PEDAL APPARATUS

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Hyeon Uk Kim, Daegu (KR); Ji Soo Kim, Daegu (KR); Jong Hwan Han, Daegu (KR)

(73) Assignees: Hyundai Motor Company, Seoul (KR); Kia Corporation, Seoul (KR); Kyung Chang Industrial Co., Ltd., Daegu (KR)

(*) Notice: Subject to any disclaimer, the term of this patent is extended or adjusted under 35 U.S.C. 154(b) by 0 days.

(21) Appl. No.: 17/842,703

(22) Filed: Jun. 16, 2022

(65) Prior Publication Data
US 2023/0195156 A1 Jun. 22, 2023

(30) Foreign Application Priority Data
Dec. 22, 2021 (KR) .................. 10-2021-0185246

(51) Int. Cl.
*G05G 1/44* (2008.04)
*B60T 7/04* (2006.01)

(52) U.S. Cl.
CPC ............... *G05G 1/44* (2013.01); *B60T 7/042* (2013.01)

(58) Field of Classification Search
None
See application file for complete search history.

(56) References Cited

U.S. PATENT DOCUMENTS 9,141,127 B2 * 9/2015 Kim ..................... G05G 5/05
2018/0239389 A1 * 8/2018 Neubauer ........... B60K 26/021

FOREIGN PATENT DOCUMENTS

KR 10-2020-0070946 6/2020

* cited by examiner

Primary Examiner — Vicky A Johnson
(74) Attorney, Agent, or Firm — MORGAN, LEWIS & BOCKIUS LLP

(57) ABSTRACT

An organ-type electronic pedal apparatus includes a high-load spring module and a hysteresis lever and configured for tuning a pedal effort, a stroke, and a hysteretic force, which are required to vary depending on the types of vehicles, by changing components of the hysteresis lever, as necessary.

20 Claims, 17 Drawing Sheets

ORGAN-TYPE ELECTRONIC PEDAL APPARATUS

CROSS-REFERENCE TO RELATED APPLICATION

The present application claims priority to Korean Patent Application No. 10-2021-0185246, filed Dec. 22, 2021, the entire contents of which is incorporated herein for all purposes by this reference.

BACKGROUND OF THE PRESENT DISCLOSURE

Field of the Present Disclosure

The present disclosure relates to an organ-type electronic pedal apparatus, and more particularly, to a technology related to an organ-type electronic brake pedal apparatus capable of tuning a pedal effort, a stroke, and a hysteretic force target by a driver by changing components of a hysteresis lever.

Description of Related Art

In general, pedal apparatuses for a vehicle are classified, depending on maintaining structures, into a pendant-type pedal apparatus provided by being hung on a dash panel and an organ-type pedal apparatus provided on a floor panel.

The pendant-type pedal apparatus has a pedal pad having a rotation center provided at an upper side thereof so that a driver operates the pendant-type pedal apparatus by pressing a lower portion of the pedal pad or pushing the pedal pad forward by use of a front portion of the driver's foot. The organ-type pedal apparatus has a pedal pad including a rotation center provided at a lower side thereof so that a driver operates the organ-type pedal apparatus by rotating an upper portion of the pedal pad forward thereof.

The advantage of the organ-type pedal apparatus is that an area of the pedal pad pushed by the driver's foot is large, and a motion of the pedal pad is similar to a trajectory of the driver's foot, which makes it possible to improve operating characteristics. Therefore, the driver may more comfortably operate the organ-type pedal apparatus in comparison with the pendant-type pedal apparatus.

However, the currently used organ-type pedal apparatus cannot effectively cope with pedal efforts, strokes, and hysteretic forces required to vary depending on the types of vehicles. For the present reason, the entire pedal apparatus needs to be newly manufactured to meet the requirement, which requires a large amount of investment cost.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal apparatus including a high-load spring module and a hysteresis lever, the electronic pedal apparatus being configured for tuning a pedal effort, a stroke, and a hysteretic force, which are required to vary in accordance with the types of vehicles, by changing components of the hysteresis lever, reducing costs, simplifying the configuration, miniaturizing the package, and reducing production costs.

To achieve the above-mentioned object, various aspects of the present disclosure are directed to providing an electronic pedal apparatus including: a pedal housing; a pedal pad rotatably coupled to the pedal housing and configured to be manipulated by a driver; a hysteresis lever engaged to the pedal housing to be rotatable relative to the pedal housing and having an upper side inserted into the pedal pad and being in contact with an internal surface of the pedal pad, the hysteresis lever being configured to generate hysteresis by a frictional force between the pedal pad and the hysteresis lever when the pedal pad rotates; and a spring module provided so that first and second end portions thereof are supported on the pedal pad and the hysteresis lever, respectively.

The electronic pedal apparatus may further include a plurality of stroke detectors mounted to the pedal housing, connected to the pedal pad, and configured to generate signals related to a pedal function when the pedal pad rotates.

The pedal pad may include: a box-shaped pad portion including a pad surface configured to be manipulated by the driver, the pad portion being configured so that one end portion of the spring module is inserted and provided into the pad portion and the upper side of the hysteresis lever is inserted into the pad portion; a pad portion friction plate coupled to an internal surface of the pad portion and configured to generate a frictional force by contact with the hysteresis lever; and a pedal arm portion including a first end portion connected to the pad portion and a second end portion coupled to a hinge pin.

The pad portion and the pedal arm portion may be connected in a shape of "L".

A detector pin may be provided on the pedal arm portion and provided above the hinge pin, the detector pin may be coupled to a detector lever of a stroke detector.

The pad portion may penetrate a housing hole formed in the pedal housing and be inserted into the pedal housing or protrude from the pedal housing depending on a rotation of the pedal pad, and the pedal arm portion may be positioned always in the pedal housing regardless of the rotation of the pedal pad.

A housing hole may be formed in the pedal housing, the pad portion may penetrate the housing hole, and a foreign-substance-inflow-prevention guide may be coupled along a rim portion of the housing hole.

The foreign-substance-inflow-prevention guide may include: a fixing portion fixedly coupled along the rim portion of the housing hole; and a tension portion extending from the fixing portion and being in contact with an external surface of the pad portion to eliminate a gap between the pad portion and the housing hole.

A foreign-substance-discharge hole may be formed in a bottom surface in the pedal housing and discharge foreign substances, which are introduced into the pedal housing, to the outside of the pedal housing.

A foreign-substance-penetration-prevention projection may protrude from a bottom surface in the pedal housing and prevent foreign substances introduced into the pedal housing from penetrating into the stroke detector.

The hysteresis lever may include: a plate portion on which a lower end portion of the spring module is supported, the plate portion including a rear end portion provided to be rotatable relative to the pedal housing about a lever shaft; a lever portion extending upwards from the plate portion and inserted into the pad portion; and a lever friction portion protruding from an end portion of the lever portion and being in contact with the pad portion friction plate, and the hysteresis lever may be provided to be positioned in the pedal housing.

An upper surface of the pad portion, the pad portion friction plate, and the lever friction portion may have the same shape while each having an inclined surface inclined downwardly from a center portion thereof toward first and second opposite sides thereof, and the pad portion friction plate and the lever friction portion may be in surface-contact with each other.

The pad portion friction plate may have an arc shape having a same rotation radius as the pedal pad in a longitudinal direction of the pad portion and be kept always in contact with the lever friction portion when the pedal pad rotates.

When the pad portion is rotated to be inserted into the pedal housing, a spring force of the spring module may be increased, and a force of the lever friction portion pressing the pad portion friction plate may be increased by a rotation of the hysteresis lever by the spring force so that a frictional force may be increased, and hysteresis may be implemented when the pedal pad is operated by the increased frictional force.

A rubber damper may be coupled to the plate portion and generate a pedal effort while being elastically deformed by contact with the pedal arm portion when the pedal pad rotates.

The plate portion and the lever portion may be connected in a shape of "L".

The hysteresis lever may include: a plate portion on which a lower end portion of the spring module is supported; a lever portion extending upwards from the plate portion and inserted into the pad portion; a lever friction portion protruding from an end portion of the lever portion and being in contact with the pad portion friction plate; and a pair of lateral portions extending upwards from two opposite sides of the plate portion spaced apart rearward from the lever portion, the pair of lateral portions each having an end portion coupled to be rotatable relative to the pedal housing, and the hysteresis lever may be provided to be positioned in the pedal housing.

The spring module may include: an upper cover including a rod portion and provided on an internal surface of the pad portion; a lower cover including an external guide groove and an internal guide groove into which the rod portion is inserted, the lower cover being provided on the hysteresis lever; a rubber stopper fixed by being fitted into the external guide groove of the lower cover; a spring guide movably provided by being fitted into the external guide groove of the lower cover; an upper spring provided so that first and second opposite end portions thereof are supported on the upper cover and a first surface of the spring guide; a lower spring provided so that first and second opposite end portions thereof are supported on the lower cover and a second surface of the spring guide; and a center spring configured to penetrate the spring guide and provided so that first and second opposite end portions thereof are supported on the upper cover and the lower cover.

The center spring may have a longest length, the lower spring may have a shorted length, and the upper spring may have an intermediate length between a length of the center spring and a length of the lower spring.

Furthermore, various aspects of the present disclosure are directed to providing an electronic pedal apparatus, in which a pedal pad and a hysteresis lever are rotatably provided in a pedal housing, an upper side of the hysteresis lever is inserted into the pedal pad and provided to be in contact with an internal surface of the pedal pad, in which a rotation center of the pedal pad is positioned rearward from a rotation center of the hysteresis lever, and in which when a box-shaped pad portion of the pedal pad is rotated to be inserted into the pedal housing, a contact force between the hysteresis lever and the pedal pad is increased by a difference in rotation trajectory between the pedal pad and the hysteresis lever so that a frictional force increased, and hysteresis is implemented when the pedal pad is operated by the increased frictional force.

The electronic pedal apparatus according to an exemplary embodiment of the present disclosure includes the high-load spring module and the hysteresis lever. The electronic pedal apparatus may tune the pedal effort, the stroke, and the hysteretic force, which are required to vary depending on the types of vehicles, by changing the components of the hysteresis lever, as necessary. Therefore, it is possible to reduce costs, simplify the configuration, miniaturize the package, reduce production costs, and minimize the fatigue of the driver's ankle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
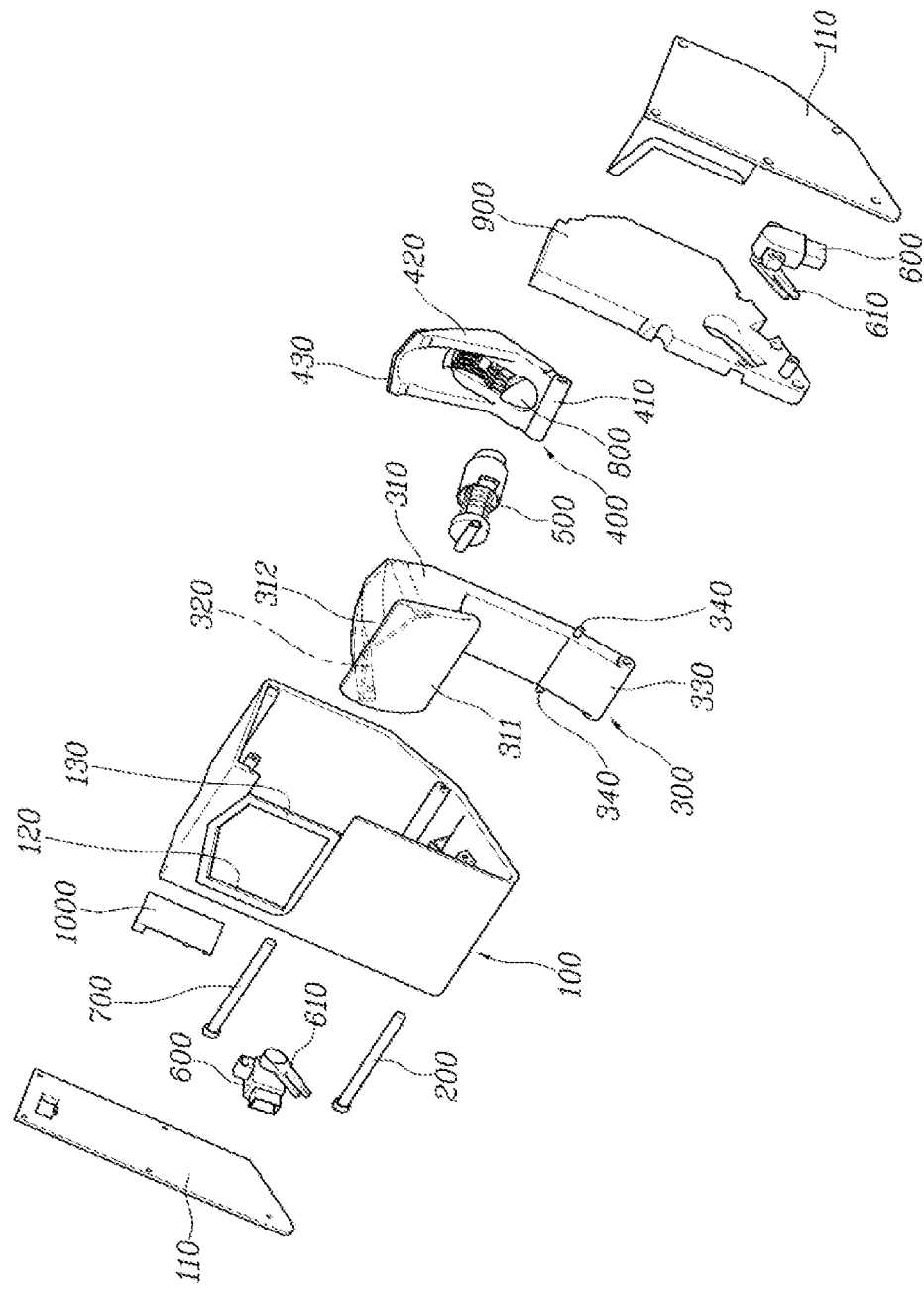
FIG. 1 is an exploded view of an organ-type electronic pedal apparatus according to an exemplary embodiment of the present disclosure.
Figure 2:
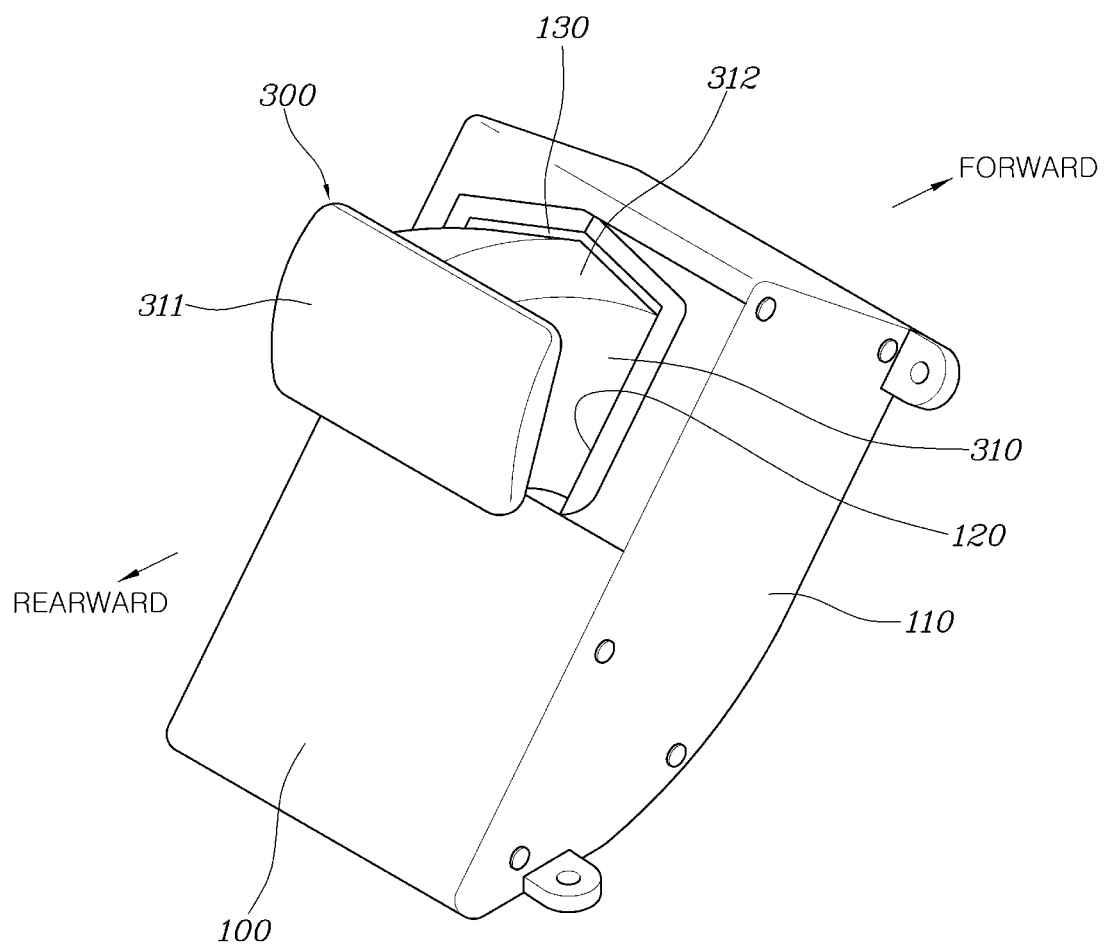
FIG. 2 is a view exemplarily illustrating an assembled state of the organ-type electronic pedal apparatus illustrated in FIG. 1.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of embodiments of the present disclosure included in the exemplary embodiment or application are exemplified only for explaining the exemplary embodiments according to an exemplary embodiment of the present disclosure, the exemplary embodiments of the present disclosure may be conducted in various forms, and it may not be interpreted that the present disclosure is limited to the exemplary embodiments described in the exemplary embodiment or application.

Because the exemplary embodiments of the present disclosure may be variously changed and may have various forms, specific embodiments will be illustrated in the drawings and described in detail in the exemplary embodiment or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is referred to as being "coupled" or "connected" to another constituent element, it should be understood that one constituent element may be coupled or directly connected to another constituent element, and an intervening constituent element can also be present between the constituent elements. When one constituent element is referred to as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the exemplary embodiment are used only for describing various exemplary embodiments and are not intended to limit the present disclosure. Singular expressions include plural expressions unless clearly referred to as different meanings in the context. In the exemplary embodiment, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains. The terms such as those defined in a commonly used dictionary should be interpreted as having meanings consistent with meanings in the context of related technologies and should not be interpreted as ideal or excessively formal meanings unless explicitly defined in the exemplary embodiment of the present disclosure.

A control unit (controller) according to various exemplary embodiments of the present disclosure may be implemented by a non-volatile memory configured to algorithm for controlling operations of various constituent elements in a vehicle or store data related to software commands for executing the algorithm, and by a processor configured to perform the following operations by use of the data stored in the corresponding memory. In the instant case, the memory and the processor may be implemented as separate chips. Alternatively, the memory and the processor may be implemented as a single chip in which the memory and the processor are integrated. The processor may be configured in a form of one or more processors.

Hereinafter, an organ-type electronic pedal apparatus according to various exemplary embodiments of the present disclosure will be described with reference to the accompanying drawings.

As illustrated in FIGS. 1 to 17, an organ-type electronic pedal apparatus according to various exemplary embodiments of the present disclosure may include a pedal housing 100 fixed in a lower space of a driver seat; a pedal pad 300 coupled to the pedal housing 100 and configured to be rotatable forward or rearward about a hinge pin 200, the pedal pad 300 being configured to be operated by a driver; a hysteresis lever 400 positioned in the pedal housing 100, provided to be rotatable relative to the pedal housing 100, and having an upper side inserted into the pedal pad 300 and being in contact with an internal surface of the pedal pad 300, the hysteresis lever 400 being configured to generate hysteresis by use of a frictional force with the pedal pad 300 when the pedal pad 300 rotates; and a spring module 500 provided so that two opposite end portions thereof are supported by the pedal pad 300 and the hysteresis lever 400.

The pedal housing 100 has a box shape including a vacant internal space in which the pedal pad 300, the hysteresis lever 400, the high-load spring module 500, a stroke detector to be described below, a printed circuit board (PCB) to be described below, and the like are provided. Covers 110 are separably coupled to two opposite sides of the pedal housing.

The pedal pad 300 includes: a box-shaped pad portion 310 including a pad surface 311 configured to be manipulated by the driver's foot, the pad portion 310 being configured so that one end portion of the spring module 500 is inserted into the pad portion 310 so that the pad portion 310 is rotatably provided, and an upper side of the hysteresis lever 400 is inserted into the pad portion 310; a pad portion friction plate 320 coupled to an internal surface of the pad portion 310 and configured to generate a frictional force with contact with the hysteresis lever 400; and a pedal arm portion 330 including one end portion connected to the pad portion 310 and the other end portion coupled to the hinge pin 200, the pedal arm portion 330 being connected to a stroke detector 600.

The pad portion 310 and the pedal arm portion 330 are connected in an L-shape when viewed from the lateral side, forming the organ-type pedal apparatus.

The pad portion 310 is provided to penetrate a housing hole 120 formed in the pedal housing 100. The pad portion 310 is inserted into the pedal housing 100 or protrudes from the pedal housing 100 in accordance with a rotation of the pedal pad 300. The pedal arm portion 330 is always positioned in the pedal housing 100 regardless of the rotation of the pedal pad 300.

The pad portion 310 is opened only at a lower side thereof into which the hysteresis lever 400 and the spring module 500 are inserted. All the remaining portion of the pad portion 310 are sealed to prevent an inflow of foreign substances.

A rear end portion of the pedal arm portion 330 of the pedal pad 300 is coupled to be rotatable in a forward/rearward direction relative to the pedal housing 100 about the hinge pin 200. When the pedal arm portion 330 rotates forward, the pad portion 310 spaced apart forward from the hinge pin 200 is inserted into the pedal housing 100 through the housing hole 120 formed in the pedal housing 100. When the pedal arm portion 330 rotates rearward thereof, the pad portion 310 is exposed and protrudes rearward from the pedal housing 100 toward the driver.

An upper surface 312 and a lower surface of the pad portion 310 each have an arc shape having a trajectory having the same rotation radius as the pedal pad 300 around the hinge pin 200 so that a gap between the pad portion 310 and the housing hole 120 formed in the pedal housing 100 may be constantly maintained, maximally preventing an inflow of foreign substances.

The pad portion 310 is provided to penetrate the housing hole 120 formed in the pedal housing 100. The pad portion 310 is inserted into the pedal housing 100 or protrudes from the pedal housing 100 in accordance with the rotation of the pedal pad 300. The pedal arm portion 330 is always positioned in the pedal housing 100 regardless of the rotation of the pedal pad 300 so that the pedal arm portion 330 is prevented from coming into contact with the driver.

Therefore, when the driver manipulates the pedal pad 300 with his or her foot, only the pad surface 311 of the pad portion 310 exposed from the pedal housing 100 may be manipulated, and the pedal arm portion 330 positioned in the pedal housing 100 cannot be manipulated because the pedal arm portion 330 is prevented from coming into contact with the driver's foot, preventing an erroneous manipulation of the driver.

According to an exemplary embodiment of the present disclosure, a foreign-substance-inflow-prevention guide 130 is coupled to the housing hole 120 and provided along a rim portion of the housing hole 120 formed in the pedal housing 100.

The foreign-substance-inflow-prevention guide 130 is configured to eliminate a gap between the housing hole 120 of the pedal housing 100 and the pad portion 310 of the pedal pad 300, preventing foreign substances from flowing into the pedal housing 100 through the housing hole 120.

The foreign-substance-inflow-prevention guide 130 may be made of a rubber material having elasticity to prevent abrasion and noise caused by contact with the pad portion 310, but the present disclosure is not limited thereto.

Figure 8:
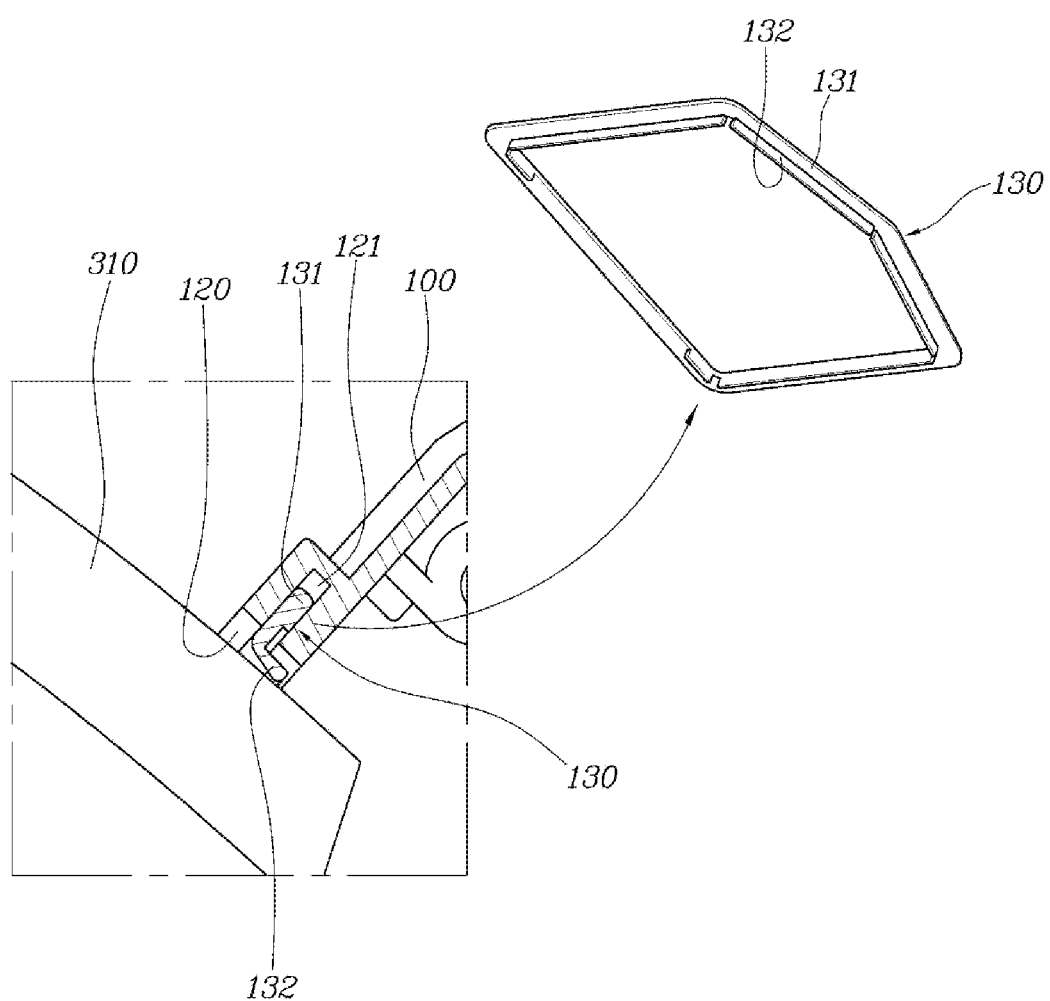
FIG. 8 is a view for explaining a foreign-substance-inflow-prevention guide according to an exemplary embodiment of the present disclosure.
Figure 9:
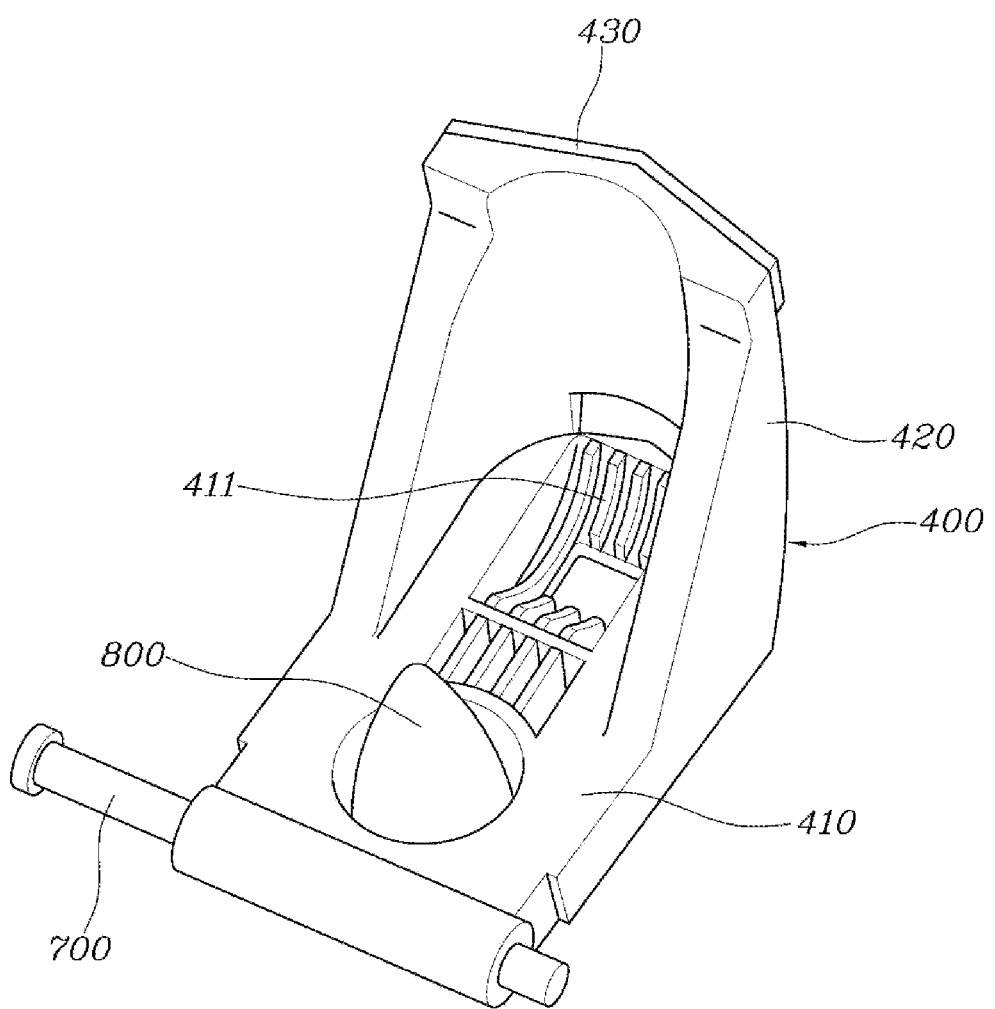
FIG. 9 is a view for explaining an L-shape hysteresis lever according to an exemplary embodiment of the present disclosure.

As illustrated in FIG. 8, the foreign-substance-inflow-prevention guide 130 includes: a fixing portion 131 fixedly coupled along the rim portion of the housing hole 120; and a tension portion 132 extending from the fixing portion 131 and being in contact with an external surface of the pad portion 310 to eliminate a gap between the pad portion 310 and the housing hole 120.

A coupling groove 121 is formed in the pedal housing 100 and provided along the rim portion of the housing hole 120. The fixing portion 131 of the foreign-substance-inflow-prevention guide 130 is fixed by being fitted into the coupling groove 121. The tension portion 132 extends inwardly from the fixing portion 131 and is provided to be in contact with the external surface of the pad portion 310.

Figure 5:
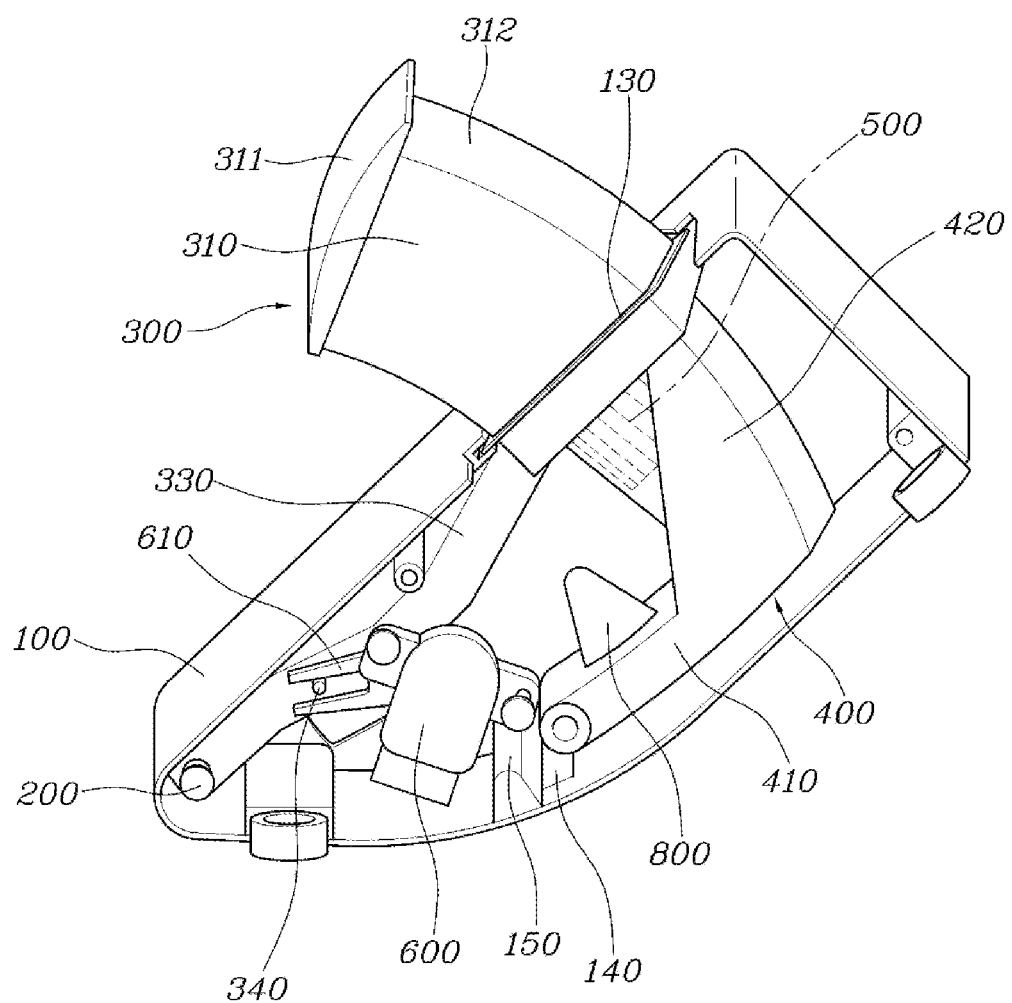
FIG. 5 is a view exemplarily illustrating an internal structure of the pedal apparatus according to an exemplary embodiment of the present disclosure.
Figure 6:
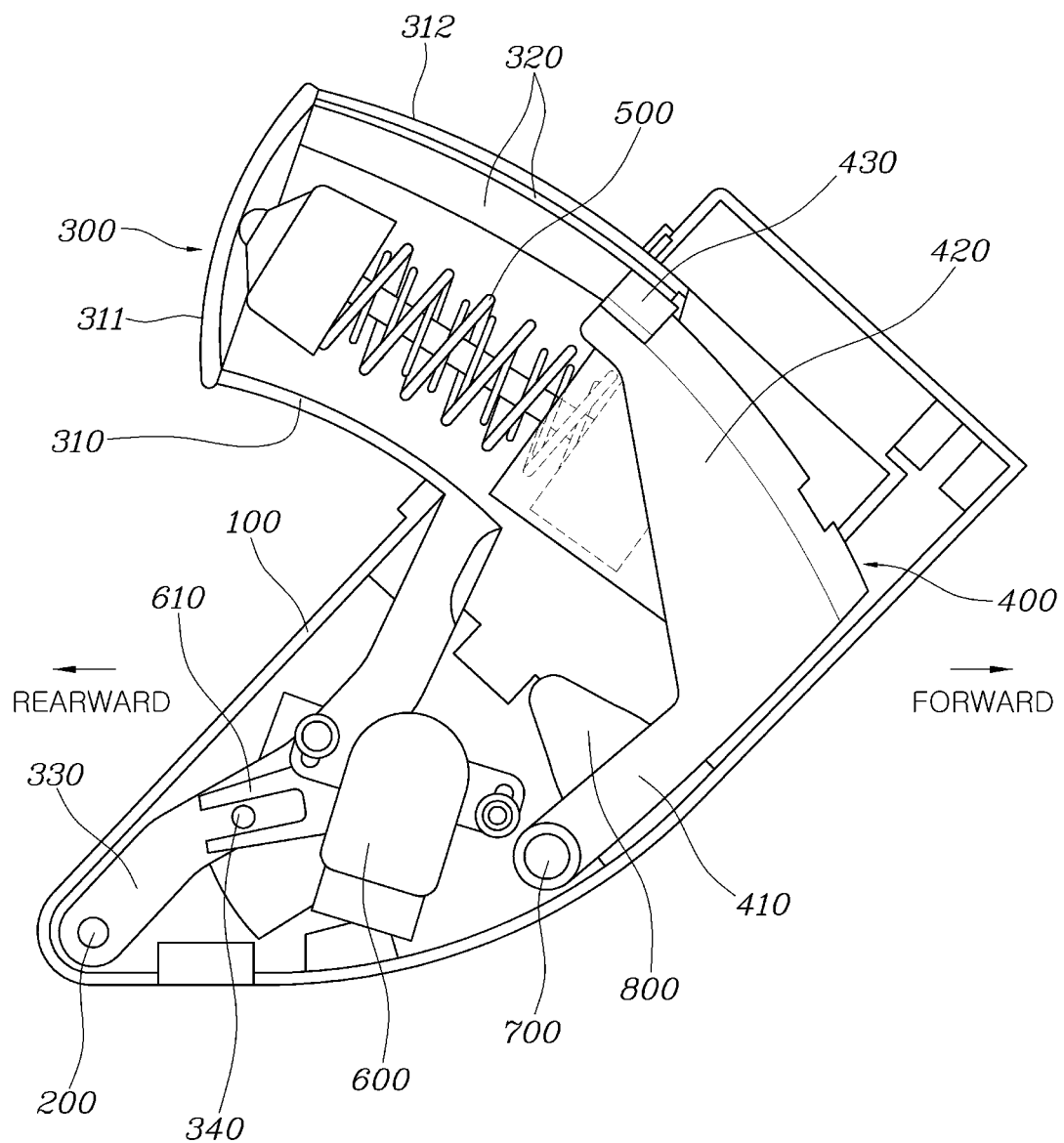
FIG. 6 is a side view exemplarily illustrating a state before a pedal pad is operated according to an exemplary embodiment of the present disclosure.
Figure 7:
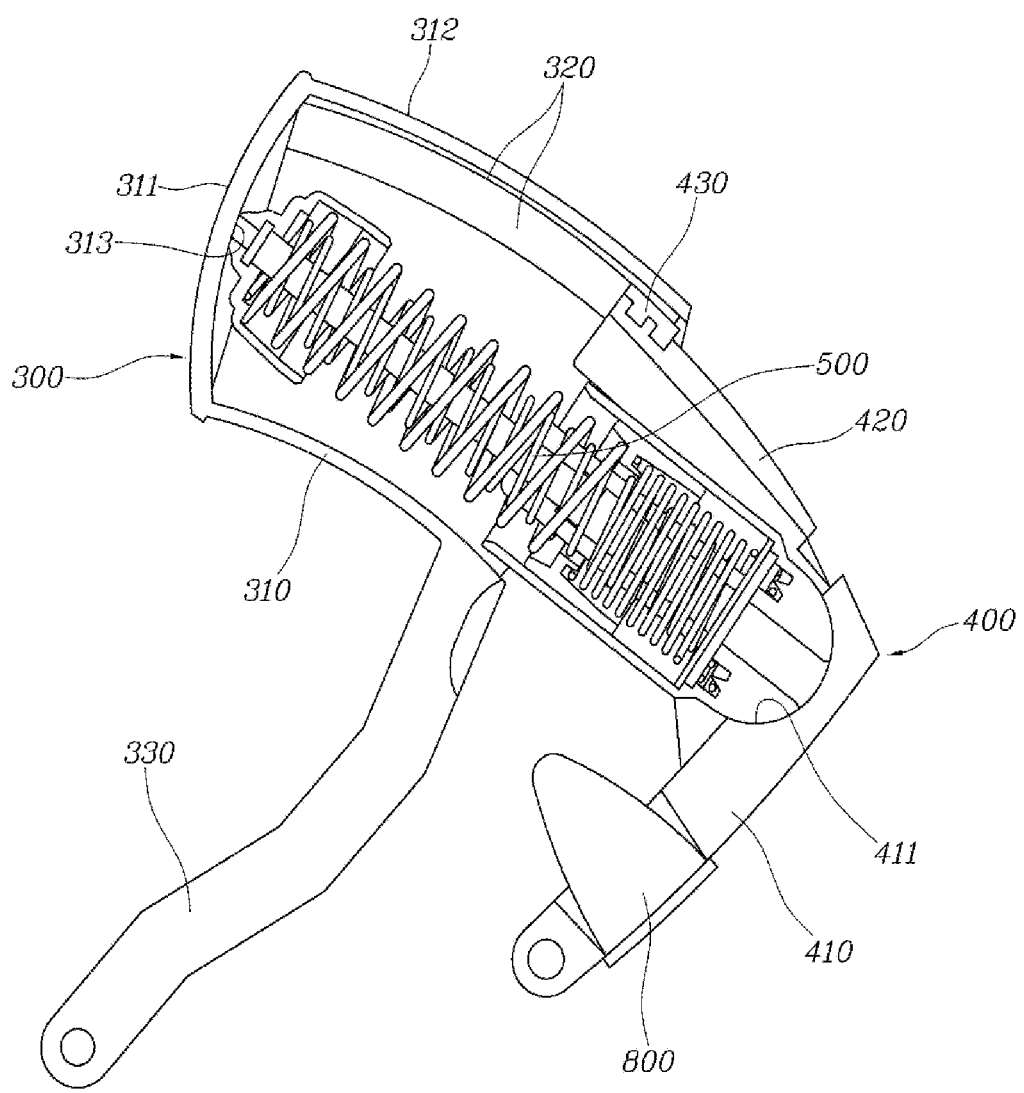
FIG. 7 is a view exemplarily illustrating a spring module, a hysteresis lever, and the pedal pad illustrated in FIG. 6.

As illustrated in FIG. 5, a foreign-substance-discharge hole 140 may be formed in a bottom surface in the pedal housing 100 and discharge foreign substances, which are introduced into the pedal housing 100, to the outside. Furthermore, a foreign-sub stance-penetration-prevention projection 150 may protrude upward and prevent foreign substances introduced into the pedal housing 100 from penetrating into the stroke detector 600.

The foreign-substance-penetration-prevention projection 150 is configured to prevent damage to and breakage of the stroke detector 600 caused by foreign substances.

The spring module 500 is a high-load spring module. The spring module 500 is provided to be positioned in an oblique direction in a direction in which the pad portion 310 moves. An upper end portion of the spring module 500 is inserted into the pad portion 310 of the pedal pad 300 and rotatably coupled to the pad portion 310, and a lower end portion of the spring module 500 is provided to be rotatable while being in contact with the hysteresis lever 400.

The two opposite end portions of the spring module 500 each have an arc shape so that the spring module 500 is rotatably provided. Arc grooves 313 and 411 are respectively formed in the hysteresis lever 400 and an internal surface of the pad surface 311 of the pad portion 310.

A high load is required to manipulate the pedal apparatus of a vehicle to ensure safety. To the present end, the exemplary embodiment of the present disclosure adopts the high-load spring module 500. The high-load spring module 500 may be used to a necessary pedal effort.

The high-load spring module 500 typically may have two or more springs and two or more dampers provided in series to implement the pedal effort.

Figure 10:
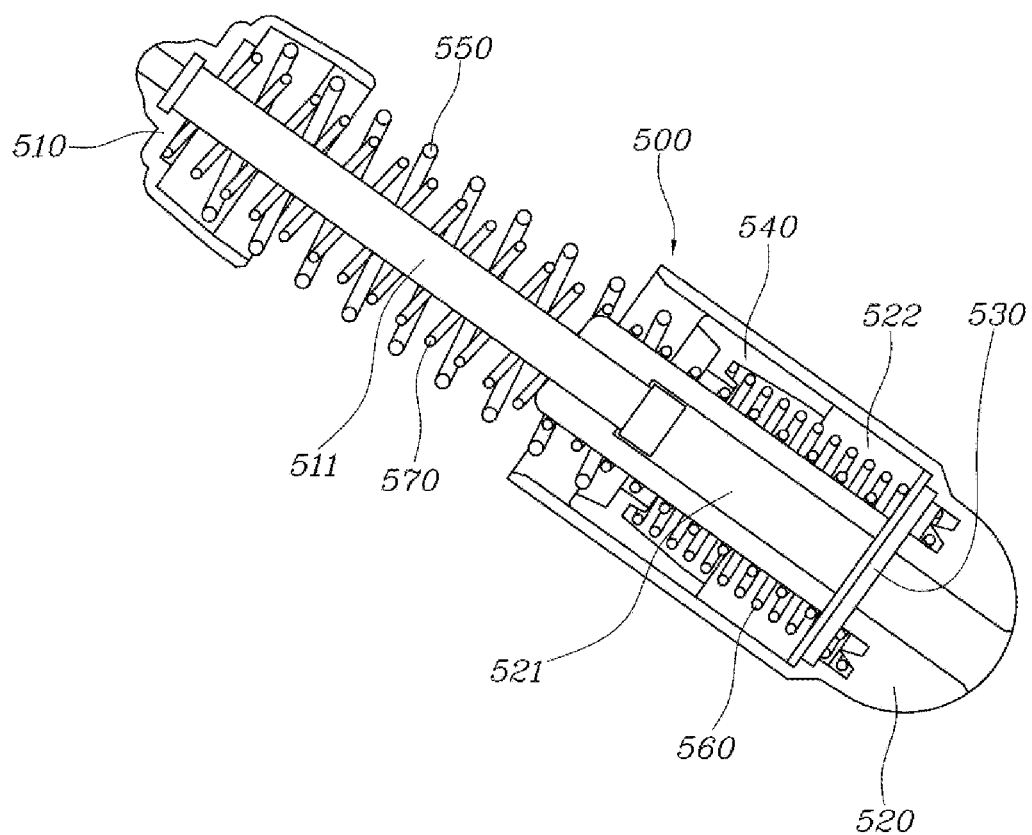
FIG. 10, and FIG. 11 are views for explaining a high-load spring module.
Figure 11:
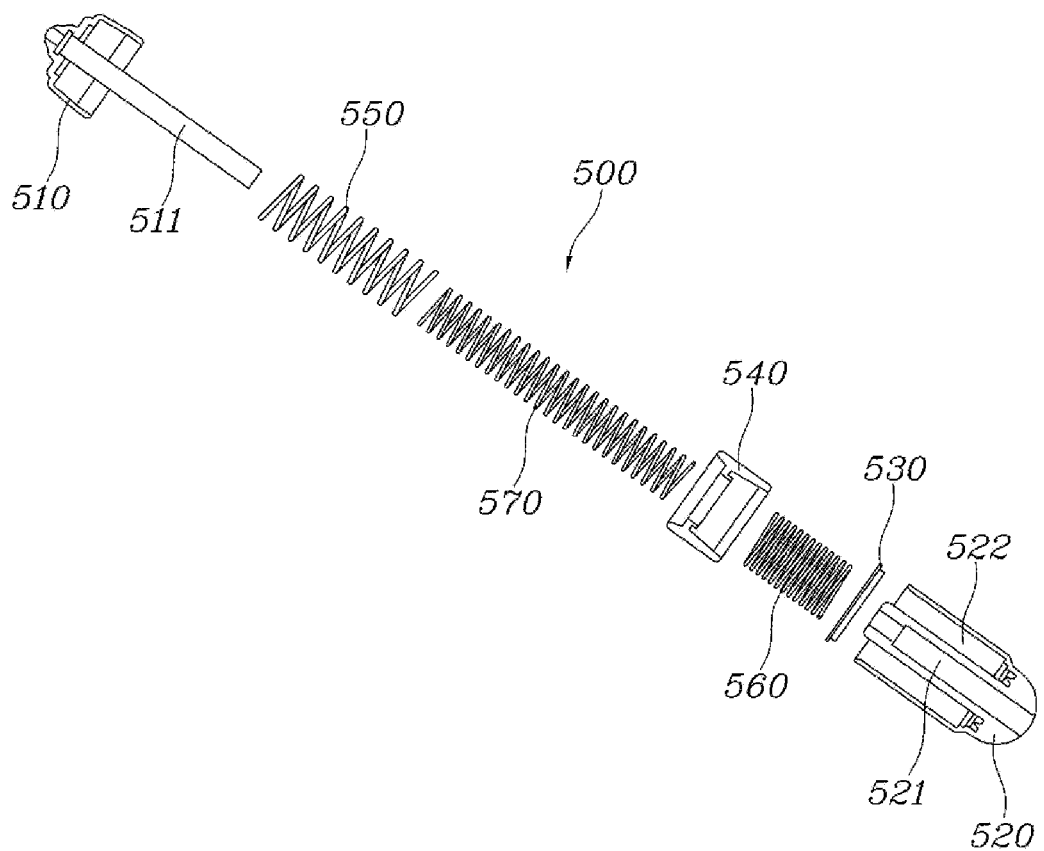

That is, as illustrated in FIG. 10, and FIG. 11, the high-load spring module 500 includes an upper cover 510 including a rod portion 511, a lower cover 520 including an internal guide groove 521 and an external guide groove 522, a rubber stopper 530, a spring guide 540, an upper spring 550, a lower spring 560, and a center spring 570.

An upper side of the upper cover 510 is formed in an arc shape and rotatably provided in the arc groove 313 formed in the internal surface of the pad surface 311.

A lower side of the lower cover 520 is also formed in an arc shape and rotatably provided in the arc groove 411 formed in the hysteresis lever 400.

The rod portion 511 of the upper cover 510 is inserted into the internal guide groove 521 of the lower cover 520. The rubber stopper 530 is fixed and fitted into the external guide groove 522, and the spring guide 540 is movably provided in the external guide groove 522.

The upper spring 550 is provided so that two opposite end portions thereof are supported on the upper cover 510 and one surface of the spring guide 540. The lower spring 560 is provided so that two opposite end portions thereof are supported on the lower cover 520 and the other surface of the spring guide 540. The center spring 570 is provided so that two opposite end portions thereof are supported on the upper cover 510 and the lower cover 520.

The high-load spring module 500 according to an exemplary embodiment of the present disclosure includes the three springs, i.e., the upper spring 550, the lower spring 560, and the center spring 570. Therefore, even though any one of the three springs are broken, the remaining two springs, which are not broken, may provide a force and smoothly return the pedal pad 300.

The center spring 570 has the longest length, the lower spring 560 has the shortest length, and the upper spring 550 has an intermediate length.

The upper spring 550 has the highest spring constant K, the center spring 570 has the lowest spring constant K, and the lower spring 560 has an intermediate value of spring constant K.

Figure 12:
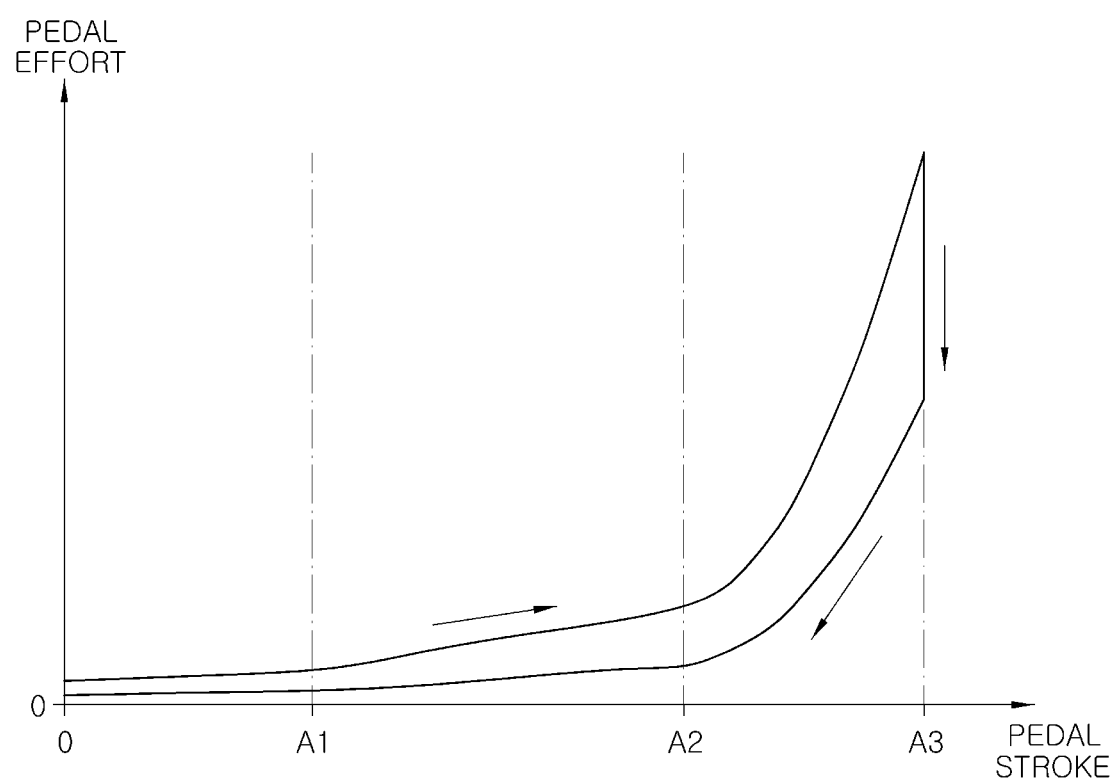
FIG. 12 is a graph illustrating a pedal stroke and a pedal effort of the pedal apparatus according to an exemplary embodiment of the present disclosure.
Figure 13:
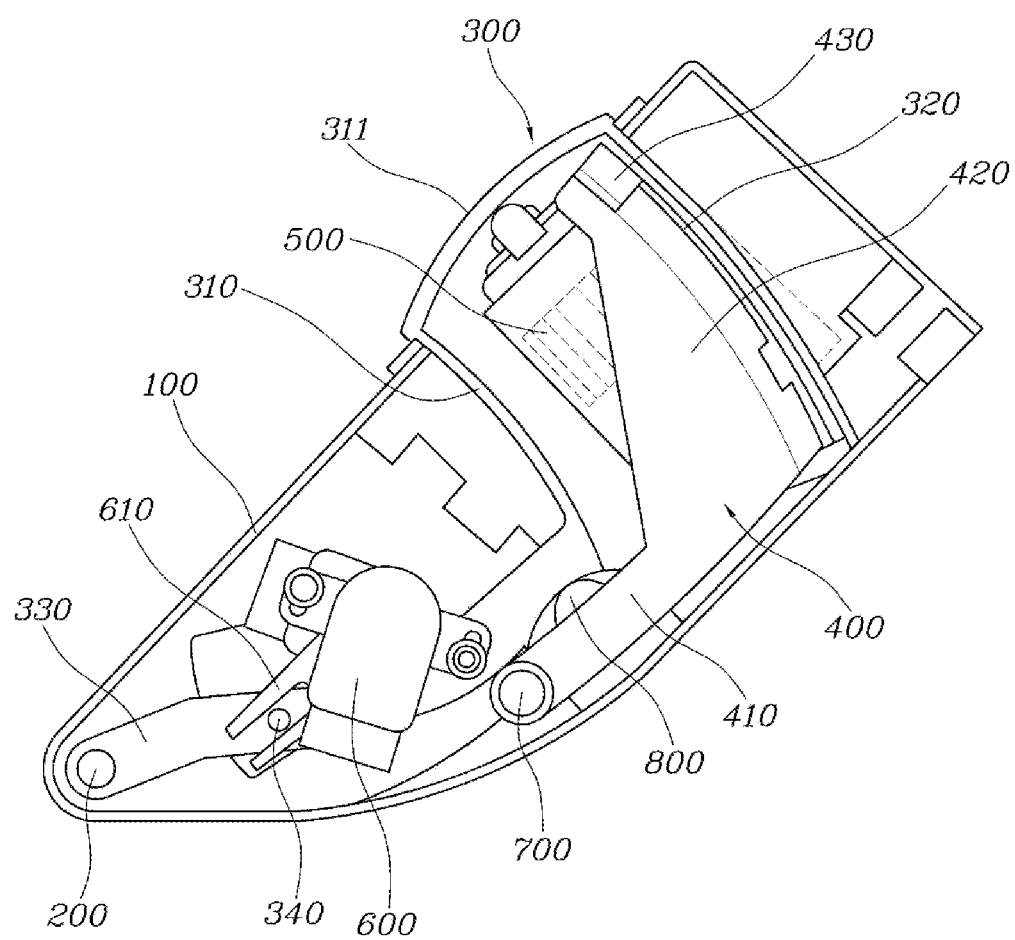
FIG. 13 is a view exemplarily illustrating a state in which a pad portion pad portion inserted into a pedal housing by operation of the pedal pad illustrated in FIG. 6.
Figure 14:
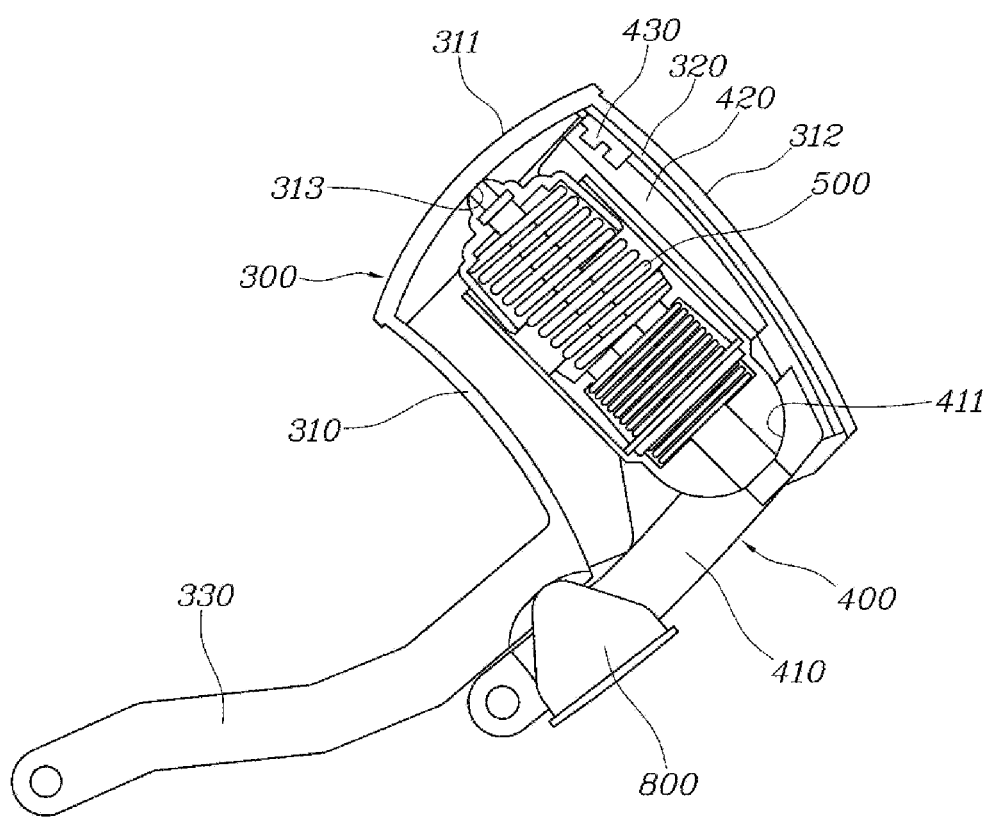
FIG. 14 is a view exemplarily illustrating the spring module, the hysteresis lever, and the pedal pad illustrated in FIG. 13.

FIG. 12 is a graph illustrating a pedal stroke and a pedal effort.

Depending on the lengths and values of spring constant K of the springs, the center spring 570 and the lower spring 560 are compressed first, when the pedal pad 300 is operated, and generate an initial pedal effort (section from 0 to A1). After the compression of the lower spring 560 is completed, the center spring 570 and the upper spring 550 are compressed and generate an intermediate pedal effort (section from A1 to A2). Lastly, a rubber damper 800 to be described below is compressed and generate a largest final pedal effort (section from A2 to A3).

In an exemplary embodiment of the present disclosure, the electronic pedal apparatus further includes a plurality of stroke detectors 600 fixed in the pedal housing 100 and connected to the pedal pad 300. The plurality of stroke detectors 600 generates signals related to pedal functions when the pedal pad 300 rotates.

The stroke detector 600 has a detector lever 610 rotatably coupled, and the detector lever 610 is coupled to a detector pin 340 provided on the pedal pad 300. When the pedal pad 300 rotates relative to the pedal housing 100, the detector lever 610 rotates by the detector pin 340.

The detector pin 340 is positioned above the hinge pin 200 coupled to the pedal arm portion 330 and protrudes toward two opposite sides of the pedal arm portion 330.

The detector pin 340 is provided between the pad portion 310 and the hinge pin 200 and protrudes from the pedal arm portion 330 toward the two opposite sides of the pedal arm portion 330.

Because the detector pin 340 is provided on the pedal arm portion 330, a position of the stroke detector 600 may be adjacent to the pedal arm portion 330, which makes it possible to reduce an overall size.

The stroke detector 600 is configured to detect whether the pedal pad 300 returns to an initial position when the pedal pad 300 rotates. The stroke detector 600 is also configured to detect a rotation of the pedal pad 300 when the driver presses and operates the pedal pad 300.

The stroke detector 600 includes a permanent magnet and a printed circuit board (PCB) facing the permanent magnet. When the pedal pad 300 is rotated by the manipulation of the driver, the stroke detector 600 detects a rotation angle of the pedal pad 300 based on a change in intensity of a magnetic field that varies depending on a change in position of the permanent magnet, and then the stroke detector 600 generates a signal related to the pedal function.

The stroke detector 600 may be any one of an accelerator position detector (APS) configured to generate a signal related to acceleration and a brake position detector (BPS) configured to generate a signal related to braking.

Therefore, the electronic pedal apparatus according to an exemplary embodiment of the present disclosure may be used as any one of an accelerator pedal apparatus and a brake pedal apparatus or both the accelerator pedal apparatus and the brake pedal apparatus.

The stroke detector 600 according to the exemplary embodiment of the present disclosure is the contact detector connected to the pedal pad 300 by the detector lever 610 which is a mechanical structure. However, in some instances, the stroke detector 600 may be configured as a contactless detector only including a permanent magnet and a PCB.

The hysteresis lever 400 according to an exemplary embodiment of the present disclosure may be an L-shape hysteresis lever or a V-shaped hysteresis lever.

First, as illustrated in FIGS. 1 to 14, the L-shape type hysteresis lever 400 includes: a plate portion 410 on which the lower end portion of the spring module 500 is rotatably supported, the plate portion 410 including a rear end portion provided to be rotatable relative to the pedal housing 100 about a lever shaft 700; a lever portion 420 extending upwards from the plate portion 410 and inserted into the pad portion 310; and a lever friction portion 430 protruding from an end portion of the lever portion 420 and being in contact with the pad portion friction plate 320.

The lever shaft 700 may be integrated with the pedal housing 100. Alternatively, the lever shaft 700 may be configured as a separate component separated from the pedal housing 100 and fixedly coupled to the pedal housing 100.

The lever shaft 700 is provided to penetrate the rear end portion of the plate portion 410 of the hysteresis lever 400. Therefore, the hysteresis lever 400 is provided to be rotatable about the lever shaft 700.

The arc groove 411 is formed in the plate portion 410, and the lower end portion of the spring module 500 is rotatably supported in the arc groove 411.

The plate portion 410 and the lever portion 420 are connected in an L-shape when viewed from the lateral side, implementing hysteresis when the pedal pad 300 rotates.

According to an exemplary embodiment of the present disclosure, when the spring module 500 is provided so that the two opposite end portions (upper and lower end portions) thereof are supported on the pad portion 310 of the pedal pad 300 and the plate portion 410 of the hysteresis lever 400, the lever friction portion 430 of the hysteresis lever 400 is always kept in contact with the pad portion friction plate 320 by the spring force of the spring module 500. Therefore, it is possible to implement hysteresis when the pedal pad 300 rotates. An initial operating force for the pedal pad 300 may be generated by the spring force of the spring module 500.

According to an exemplary embodiment of the present disclosure, the lower end portion of the spring module 500 protrudes convexly (has a rounded portion). The arc groove 411 is formed in the plate portion 410 of the hysteresis lever 400 and matched in shape with the rounded portion of the lower end of the spring module 500.

Therefore, when the lower end portion of the spring module 500 is provided to be supported on the plate portion 410 of the hysteresis lever 400, the rounded portion of the lower end portion of the spring module 500 is inserted into the arc groove 411 of the plate portion 410. Therefore, the spring module 500 may rotate when the pedal pad 300 operates, it is possible to prevent the separation of the spring module 500.

According to an exemplary embodiment of the present disclosure, the pad portion friction plate 320, which is in contact with the lever friction portion 430 of the hysteresis lever 400, has an arc shape having the same rotation radius as the pedal pad 300 around the hinge pin 200 in a longitudinal direction of the pad portion 310. Therefore, the pad portion friction plate 320 and the lever friction portion 430 of the hysteresis lever 400 may be kept always in contact with each other when the pedal pad 300 rotates.

When the pedal pad 300 rotates, a hysteretic force is generated by the contact between the pad portion friction plate 320 and the lever friction portion 430 of the hysteresis lever 400. In the instant case, to accurately estimate a hysteresis value to which the spring force is applied, a degree to which the lever friction portion 430 and the pad portion friction plate 320 are in contact with each other needs to be constant when the pedal pad 300 operates except for the spring force of the spring module 500. To the present end, the pad portion friction plate 320 may have an arc shape having the same rotation radius as the pedal pad 300 around the hinge pin 200 in the longitudinal direction of the pad portion 310.

The upper surface 312 and the lower surface of the pad portion 310 each have an arc shape having a trajectory including the same rotation radius as the pedal pad 300 around the hinge pin 200. Therefore, the gap between the pad portion 310 and the housing hole 120 formed in the pedal housing 100 may be constantly maintained, maximally preventing an inflow of foreign substances.

Furthermore, the lever friction portion 430, the pad portion friction plate 320, and the upper surface 312 of the pad portion 310 have the same shape while each having an inclined surface inclined downwardly in a direction from a center portion thereof toward two opposite sides thereof. The pad portion friction plate 320 and the lever friction portion 430 are in surface-contact with each other.

Figure 3:
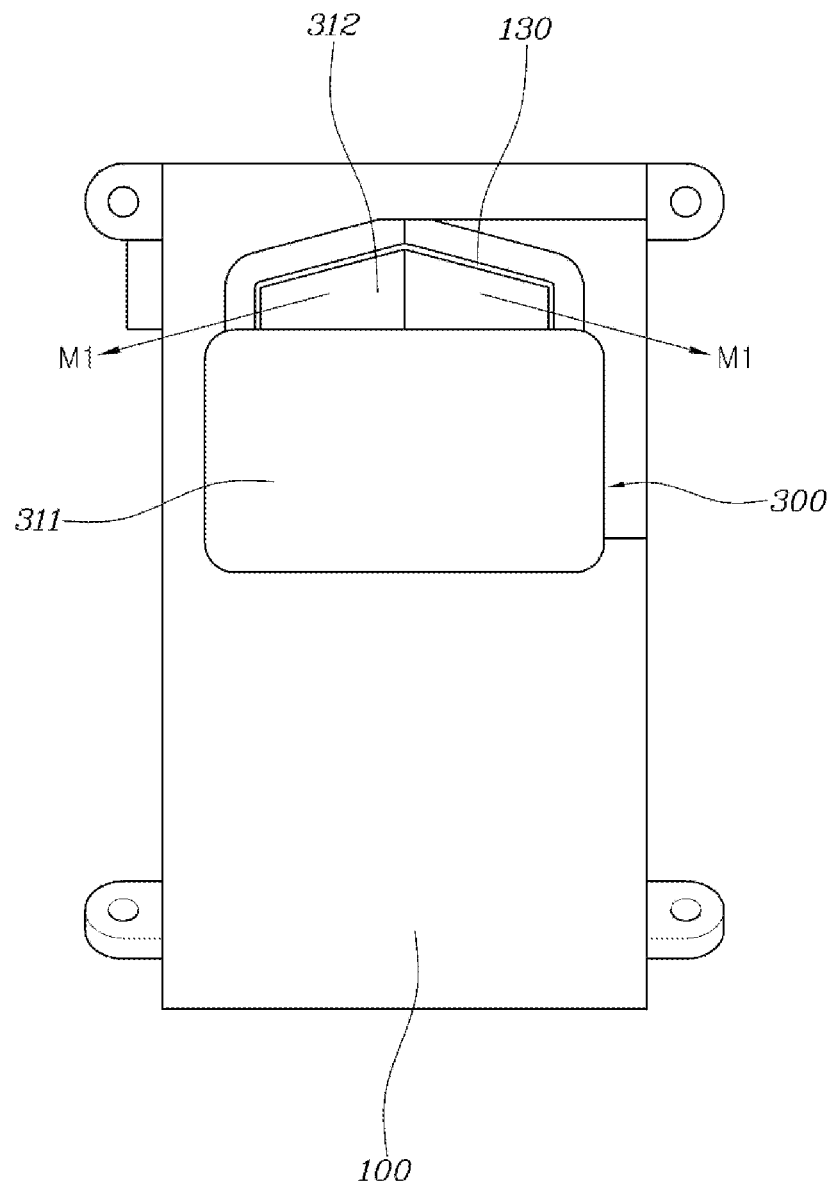
FIG. 3 is a top plan view of FIG. 2.
Figure 4:
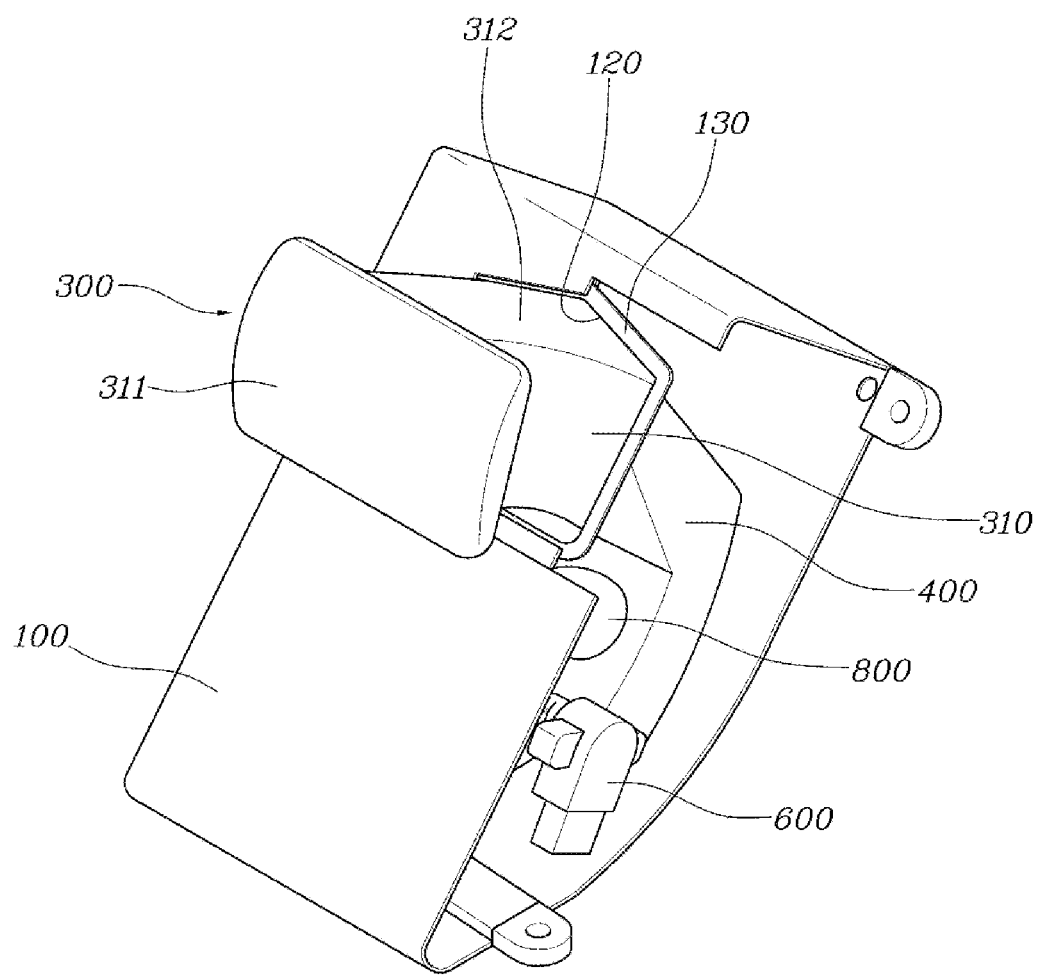
FIG. 4 is a view exemplarily illustrating a state in which a cover illustrated at the right side of FIG. 2 is removed.

First, in the case in which the upper surface 312 of the pad portion 310 has the inclined surface inclined downwardly in the direction from the center portion thereof toward the two opposite sides thereof, foreign substances being in contact with the upper surface 312 are moved leftward and rightward along the inclined surface as indicated by arrow M1 in FIG. 3 and then discharged, which makes it possible to basically prevent foreign substances from flowing into the pedal housing 100.

Furthermore, in the case in which the lever friction portion 430 of the hysteresis lever 400 and the pad portion friction plate 320 coupled to the pad portion 310 each have the inclined surface having the same shape as the upper surface 312 of the pad portion 310, the pad portion friction plate 320 and the lever friction portion 430 may be provided to be in surface-contact with each other. Therefore, it is possible to enhance the supporting force of the pad portion 310 and thus to improve strength and rigidity of the pedal pad 300 provided in a form of a cantilevered beam.

The pedal apparatus according to an exemplary embodiment of the present disclosure has the structure in which when the pad portion 310 is rotated to be inserted into the pedal housing 100 as the driver manipulates the pedal pad 300, the spring force of the spring module 500 is increased, the force of the lever friction portion 430 pressing the pad portion friction plate 320 is increased by the rotation of the hysteresis lever 400 rotated by the spring force, the frictional force is increased, and the hysteresis is implemented when the pedal pad 300 is operated by the increased frictional force.

According to an exemplary embodiment of the present disclosure, the rubber damper 800 is coupled to the plate portion 410 of the hysteresis lever 400 and generates the pedal effort while being elastically deformed by the contact with the pedal arm portion 330 when the pedal pad 300 rotates.

An end portion of the rubber damper 800, which comes into contact with the pedal arm portion 330, has a pointy conical shape. Therefore, at the initial time when the rubber damper 800 comes into contact with the pedal arm portion 330, the pedal effort is slowly increased because an area being deformed is small. As the area being deformed becomes larger, the pedal effort is rapidly increased, and as a result, the largest final pedal effort may be generated when the pedal pad 300 operates.

Figure 15:
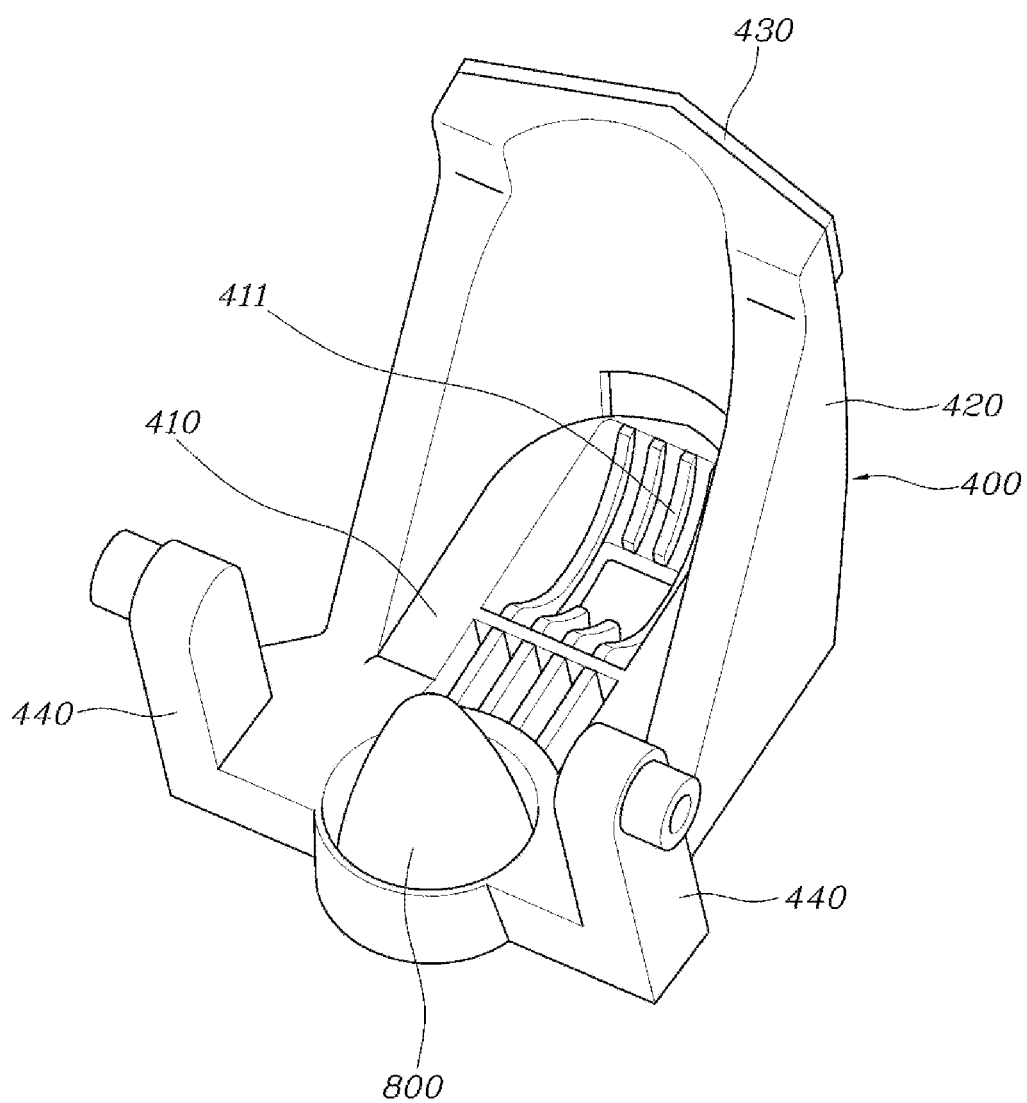
FIG. 15, FIG. 16 and FIG. 17 are views for explaining a "U"-shaped hysteresis lever according to an exemplary embodiment of the present disclosure.
Figure 16:
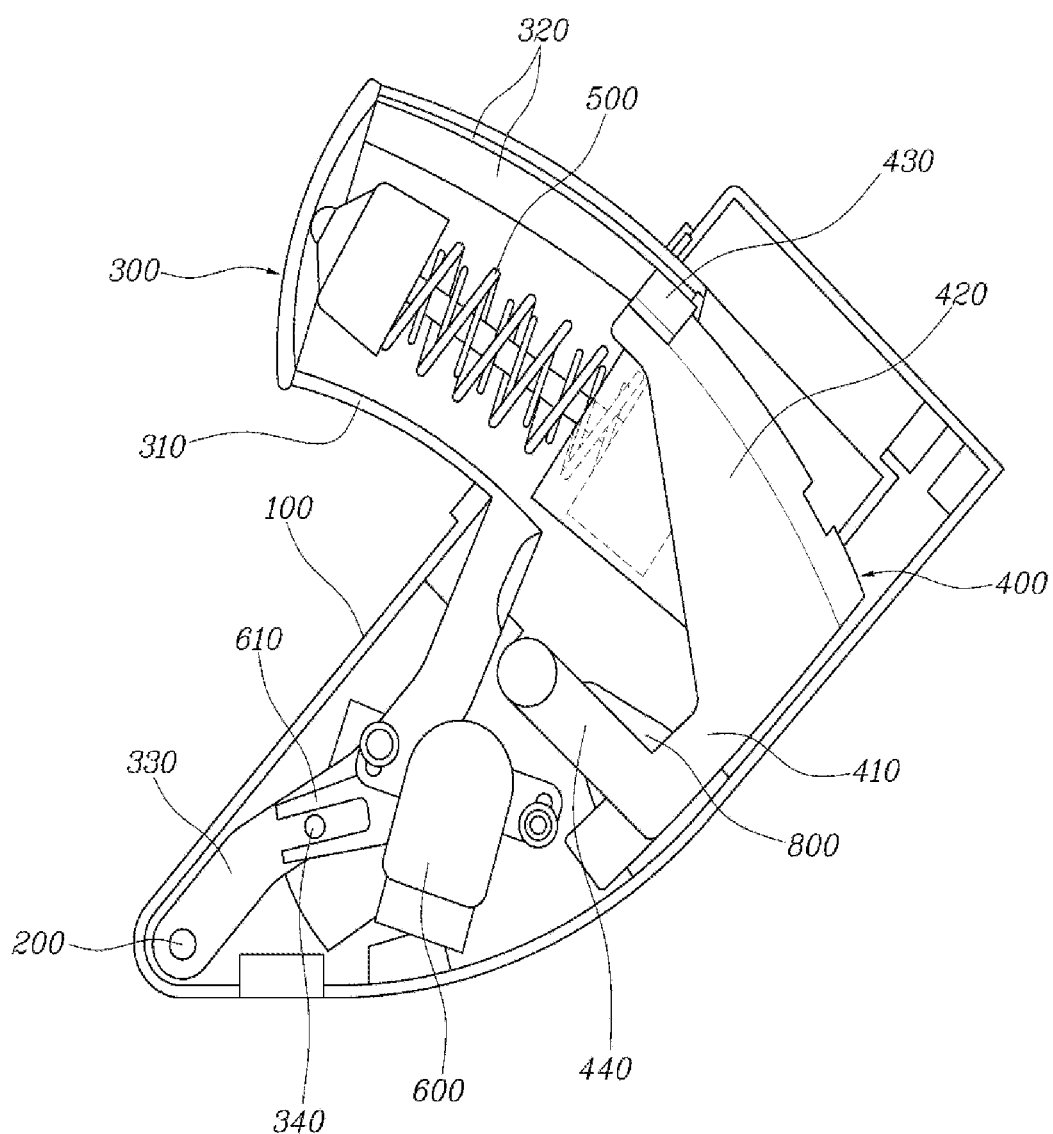
Figure 17:
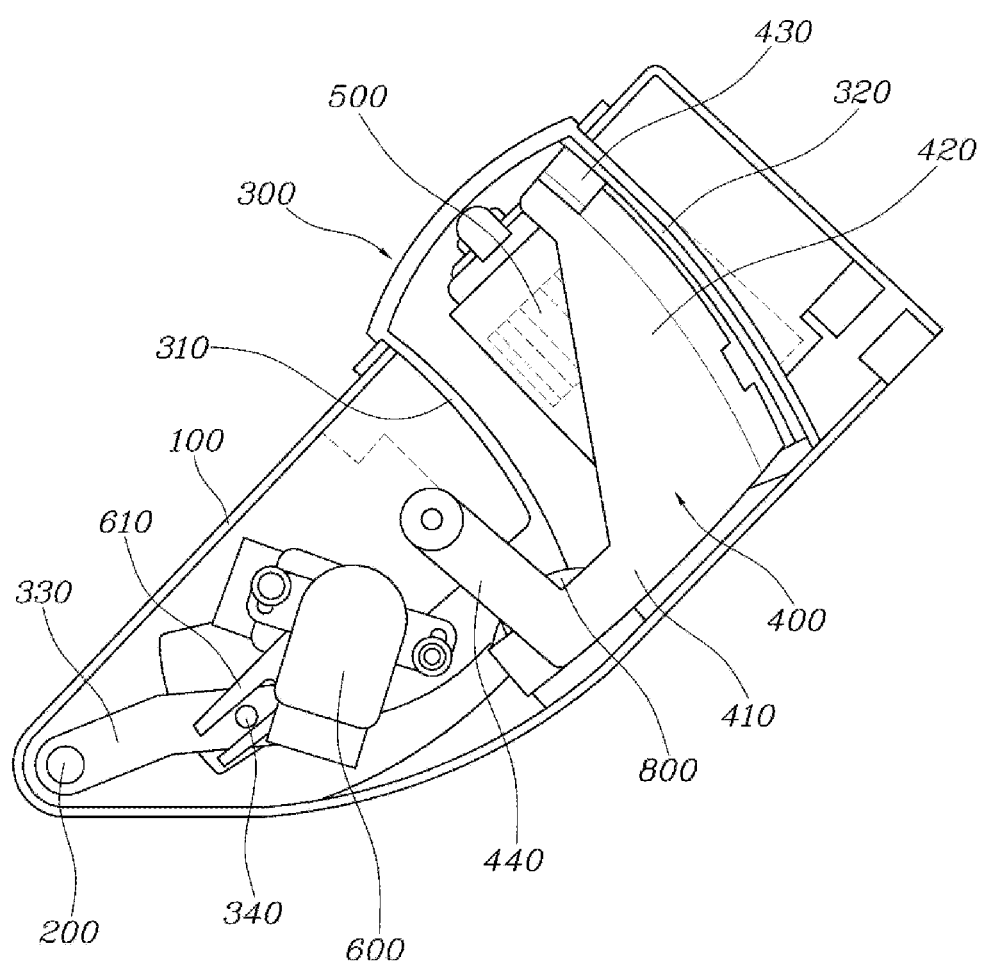

As illustrated in FIG. 15, FIG. 16 and FIG. 17, the 'U'-shaped hysteresis lever 400 includes: the plate portion 410 including the arc groove 411 in which the lower end portion of the spring module 500 is rotatably supported; the lever portion 420 extending upwards from the plate portion 410 and inserted into the pad portion 310; the lever friction portion 430 protruding from the end portion of the lever portion 420 and being in contact with the pad portion friction plate 320; and a pair of lateral portions 440 extending upwards from two opposite sides of the plate portion 410 spaced apart rearward from the lever portion 420, the pair of lateral portions 440 each having an end portion coupled to be rotatable relative to the pedal housing 100.

A rubber damper 800 identical to the above-mentioned rubber damper is provided on the plate portion 410.

The 'U'-shaped hysteresis lever 400 differs from the L-shape hysteresis lever 400 in that the 'U'-shaped hysteresis lever 400 further includes the pair of lateral portion 440 and the end portions of the lateral portions 440 are rotatably coupled to the pedal housing 100. The other configurations of the 'U'-shaped hysteresis lever 400 are identical to those of the L-shape hysteresis lever 400.

The 'U'-shaped hysteresis lever 400 has a structure in which the plate portion 410 and the pair of lateral portions 44 are connected in a U-shape.

The L-shape hysteresis lever 400 has a relatively lower lever ratio than the 'U'-shaped hysteresis lever 400. Therefore, the L-shape hysteresis lever 400 has a relatively lower hysteretic force than the 'U'-shaped hysteresis lever 400. However, the advantage of the L-shape hysteresis lever 400 is that the L-shape hysteresis lever 400 has high strength, has a small size which is advantageous in layout, has excellent formability, and is advantageous in weight reduction.

On the other hand, the advantage of the 'U'-shaped hysteresis lever 400 is that the 'U'-shaped hysteresis lever 400 has a relatively higher lever ratio and thus has a higher hysteretic force than the L-shape hysteresis lever 400.

Non-described reference numeral 900 illustrated in FIG. 1 indicates an internal bracket provided to be positioned in the pedal housing 100, and the stroke detector 600 may be fixed on the internal bracket. Furthermore, non-described reference numeral 1000 indicates the PCB fixed in the pedal housing 100, and the PCB performs failure diagnosis and CAN communication with components related to the pedal.

As described above, the organ-type electronic pedal apparatus according to an exemplary embodiment of the present disclosure includes the high-load spring module 500 and the hysteresis lever 400. The organ-type electronic pedal apparatus may tune the pedal effort, the stroke, and the hysteretic force, which are required to vary depending on the types of vehicles, by changing the components of the hysteresis lever 400, as necessary. Therefore, it is possible to reduce costs, simplify the configuration, miniaturize the package, reduce production costs, and minimize the fatigue of the driver's ankle.

Furthermore, the organ-type electronic pedal apparatus according to an exemplary embodiment of the present disclosure may be advantageously used as an accelerator pedal apparatus or a brake pedal apparatus.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:
    a pedal housing;
    a pedal pad rotatably coupled to the pedal housing and configured to be manipulated by a driver;
    a hysteresis lever engaged to the pedal housing to be rotatable relative to the pedal housing and having an upper side inserted into the pedal pad and being in contact with an internal surface of the pedal pad, the hysteresis lever being configured to generate hysteresis by a frictional force between the pedal pad and the hysteresis lever when the pedal pad rotates; and
    a spring module provided so that first and second end portions thereof are supported on the pedal pad and the hysteresis lever, respectively.

2. The electronic pedal apparatus of claim 1, further including:
    a plurality of stroke detectors mounted to the pedal housing, connected to the pedal pad, and configured to generate signals related to a pedal function when the pedal pad rotates.

3. The electronic pedal apparatus of claim 2, wherein a foreign-substance-penetration-prevention projection protrudes from a bottom surface in the pedal housing and prevents foreign substances introduced into the pedal housing from penetrating into the stroke detectors.

4. The electronic pedal apparatus of claim 1, wherein the pedal pad includes:
    a pad portion including a pad surface configured to be manipulated by the driver, wherein one end portion of the spring module is inserted and provided into the pad portion and the upper side of the hysteresis lever is inserted into the pad portion;
    a pad portion friction plate coupled to an internal surface of the pad portion and configured to generate the frictional force by contact with the hysteresis lever; and
    a pedal arm portion including a first end portion connected to the pad portion and a second end portion coupled to a hinge pin.

5. The electronic pedal apparatus of claim 4, wherein the hysteresis lever includes:
    a plate portion on which a lower end portion of the spring module is supported, the plate portion including a rear end portion provided to be rotatable relative to the pedal housing about a lever shaft;
    a lever portion extending upwards from the plate portion and inserted into the pad portion; and
    a lever friction portion protruding from an end portion of the lever portion and being in contact with the pad portion friction plate, and
    wherein the hysteresis lever is provided to be positioned in the pedal housing.

6. The electronic pedal apparatus of claim 5, wherein an upper surface of the pad portion, the pad portion friction plate, and the lever friction portion have a same shape while each having an inclined surface inclined downwardly from a center portion thereof toward first and second opposite sides thereof, and the pad portion friction plate and the lever friction portion are in surface-contact with each other.

7. The electronic pedal apparatus of claim 5, wherein the pad portion friction plate has an arc shape having a same rotation radius as the pedal pad in a longitudinal direction of the pad portion and is kept continuously in contact with the lever friction portion when the pedal pad rotates.

8. The electronic pedal apparatus of claim 5, wherein when the pad portion is rotated to be inserted into the pedal housing, a spring force of the spring module is increased, and a force of the lever friction portion pressing the pad portion friction plate is increased by a rotation of the hysteresis lever by the spring force so that a frictional force is increased, and hysteresis is implemented when the pedal pad is operated by the increased frictional force.

9. The electronic pedal apparatus of claim 5, wherein a rubber damper is coupled to the plate portion and generates a pedal effort while being elastically deformed by contact with the pedal arm portion when the pedal pad rotates.

10. The electronic pedal apparatus of claim 5, wherein the plate portion and the lever portion are connected in a shape of "L".

11. The electronic pedal apparatus of claim 4, wherein the hysteresis lever includes:
    a plate portion on which a lower end portion of the spring module is supported;

a lever portion extending upwards from the plate portion and inserted into the pad portion;

a lever friction portion protruding from an end portion of the lever portion and being in contact with the pad portion friction plate; and a pair of lateral portions extending upwards from first and second opposite sides of the plate portion spaced apart rearward from the lever portion, the pair of lateral portions each including an end portion coupled to be rotatable relative to the pedal housing, and wherein the hysteresis lever is provided to be positioned in the pedal housing.

12. The electronic pedal apparatus of claim 4, wherein the spring module includes:

an upper cover including a rod portion and provided on an internal surface of the pad portion;

a lower cover including an external guide groove and an internal guide groove into which the rod portion is inserted, the lower cover being provided on the hysteresis lever;

a rubber stopper fixed by being fitted into the external guide groove of the lower cover;

a spring guide movably provided by being fitted into the external guide groove of the lower cover;

an upper spring provided so that first and second opposite end portions thereof are supported on the upper cover and a first surface of the spring guide;

a lower spring provided so that first and second opposite end portions thereof are supported on the lower cover and a second surface of the spring guide; and a center spring configured to penetrate the spring guide and provided so that first and second opposite end portions thereof are supported on the upper cover and the lower cover.

13. The electronic pedal apparatus of claim 12, wherein the center spring has a longest length, the lower spring has a shorted length, and the upper spring has an intermediate length between a length of the center spring and a length of the lower spring.

14. The electronic pedal apparatus of claim 4, wherein the pad portion and the pedal arm portion are connected in a shape of "L".

15. The electronic pedal apparatus of claim 4, wherein a detector pin is provided on the pedal arm portion and provided above the hinge pin, and the detector pin is coupled to a detector lever of a stroke detector.

16. The electronic pedal apparatus of claim 4, wherein the pad portion is provided to penetrate a housing hole formed in the pedal housing and is inserted into the pedal housing or protrudes from the pedal housing depending on a rotation of the pedal pad, and wherein the pedal arm portion is positioned continuously in the pedal housing regardless of the rotation of the pedal pad.

17. The electronic pedal apparatus of claim 4, wherein a housing hole is formed in the pedal housing, the pad portion is provided to penetrate the housing hole, and a foreign-substance-inflow-prevention guide is coupled along a rim portion of the housing hole.

18. The electronic pedal apparatus of claim 17, wherein the foreign-substance-inflow-prevention guide includes:

a fixing portion fixedly coupled along the rim portion of the housing hole; and a tension portion extending from the fixing portion and being in contact with an external surface of the pad portion to eliminate a gap between the pad portion and the housing hole.

19. The electronic pedal apparatus of claim 1, wherein a foreign-substance-discharge hole is formed in a bottom surface in the pedal housing and discharges foreign substances, which are introduced into the pedal housing, to the outside of the pedal housing.

20. An electronic pedal apparatus, wherein a pedal pad and a hysteresis lever are rotatably provided in a pedal housing, an upper side of the hysteresis lever is inserted into the pedal pad and configured to be in contact with an internal surface of the pedal pad, wherein a rotation center of the pedal pad is positioned rearward from a rotation center of the hysteresis lever, and wherein when a pad portion of the pedal pad is rotated to be inserted into the pedal housing, a contact force between the hysteresis lever and the pedal pad is increased by a difference in rotation trajectory between the pedal pad and the hysteresis lever so that a frictional force increased, and hysteresis is implemented when the pedal pad is operated by the increased frictional force.

\* \* \* \* \*